United States Patent
Choi et al.

(10) Patent No.: US 12,036,971 B2
(45) Date of Patent: Jul. 16, 2024

(54) REDUNDANT CONTROL SYSTEM APPLIED TO BRAKE-BY-WIRE SYSTEM

(71) Applicants: Hyundai Motor Company, Seoul (KR); Kia Corporation, Seoul (KR)

(72) Inventors: Hae Ryong Choi, Seoul (KR); Dong Yoon Hyun, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 296 days.

(21) Appl. No.: 17/677,482

(22) Filed: Feb. 22, 2022

(65) Prior Publication Data

US 2022/0306063 A1    Sep. 29, 2022

(30) Foreign Application Priority Data

Mar. 29, 2021   (KR) .................. 10-2021-0040604

(51) Int. Cl.
*B60T 8/88*      (2006.01)
*B60T 13/74*     (2006.01)

(52) U.S. Cl.
CPC .......... *B60T 8/885* (2013.01); *B60T 13/741* (2013.01); *B60T 2270/404* (2013.01);
(Continued)

(58) Field of Classification Search
CPC ........ B60T 8/885; B60T 13/741; B60T 13/74; B60T 2270/404; B60T 2270/413; B60T 2270/414; B60T 2270/82; B60T 2260/02; B60T 2260/06; G05B 9/03; B60W 50/023; B60W 50/0205; B60W 10/18; B60W 10/20; B60W 10/22; B60W 2050/021; B60R 16/023; B60R 16/033
(Continued)

(56) References Cited

U.S. PATENT DOCUMENTS 6,402,259 B2    6/2002  Corio et al.
10,501,063 B2 * 12/2019  Krueger ................ B60T 8/3255
(Continued)

FOREIGN PATENT DOCUMENTS

DE    198 26 131 A1   12/1999
DE    100 43 189 A1   3/2001
(Continued)

OTHER PUBLICATIONS

Werner Zimmermann and Ralf Schmidgall, "Bus systems in automotive engineering; protocols, standards and software architecture" 5th updated and extended edition.

*Primary Examiner* — Hai H Huynh
(74) *Attorney, Agent, or Firm* — Fox Rothschild LLP

(57) ABSTRACT

A redundant control system is applied to a brake-by-wire (BBW) system. The redundant control system applied to the BBW system includes electromechanical brakes (EMBs) provided at wheels of a vehicle and configured to perform brake control of the vehicle, controllers connected to the EMBs, respectively, and a local gateway on a first communication line configured to receive information on the vehicle and a command of a driver and to transmit the information on the vehicle and the command of the driver to the controllers, where the controllers are configured to receive the information on the vehicle and the command of the driver through a second communication line.

11 Claims, 5 Drawing Sheets

(52) U.S. Cl.
CPC ... *B60T 2270/413* (2013.01); *B60T 2270/414* (2013.01); *B60T 2270/82* (2013.01)

(58) Field of Classification Search
USPC .......................................................... 701/70
See application file for complete search history.

(56) References Cited

U.S. PATENT DOCUMENTS

| | | |
|---|---|---|
| 2006/0212135 A1 | 9/2006 | Degoul et al. |
| 2008/0296106 A1 | 12/2008 | Nilsson |
| 2012/0065816 A1 | 3/2012 | Cahill |

FOREIGN PATENT DOCUMENTS

| | | |
|---|---|---|
| DE | 101 18 263 A1 | 10/2002 |
| DE | 10 2020 213 130 A1 | 4/2021 |
| WO | 99/26822 A1 | 6/1999 |

\* cited by examiner

REDUNDANT CONTROL SYSTEM APPLIED TO BRAKE-BY-WIRE SYSTEM

CROSS-REFERENCE TO RELATED APPLICATION

This application claims under 35 U.S.C. § 119(a) the benefit of Korean Patent Application No. 10-2021-0040604 filed on Mar. 29, 2021, the entire contents of which are incorporated herein by reference.

BACKGROUND

(a) Technical Field

The present disclosure relates to a redundant control system applied to a brake-by-wire (BBW) system in the event of malfunction of one or more controllers for controlling each of electronic brakes and a communication line for transmitting data from the controllers.

(b) Background Art

A brake-by-wire (BBW) system departs from the concept of a conventional brake that uses hydraulic pressure, and instead refers to a system for obtaining braking force of a vehicle by operating a caliper using driving force of a motor through an electronic control unit (ECU) and the motor. Since the BBW system does not use hydraulic pressure, the weight of the vehicle may be reduced, and engine power loss may be reduced to improve fuel efficiency. With the spread of electric vehicles, a motor-based BBW system is expected to be used as a main brake device without the need to separately use an electric pump for driving a conventional hydraulic pressure system that generates pressure using power of an engine.

In a conventional BBW system, electromechanical brakes are connected to respective wheels of a vehicle, and controllers are connected to the respective electromechanical brakes. A plurality of controllers communicate with each other through CAN communication, but a fail-safe feature of such a system has not yet been conceived to cope with failures of the CAN communication line. Accordingly, it is not possible to communicate between controllers in the case of failure of a communication line, and thus it is difficult to drive and brake a vehicle.

When any one of a plurality of controllers malfunctions, there is no specific control strategy of a vehicle, and there is no specific procedure regarding fault determination logic of the controllers.

SUMMARY

In one aspect, the present disclosure provides a redundant control system applied to a brake-by-wire (BBW) system in the event of malfunction of one or more controllers for controlling each of electronic brakes and a communication line for transmitting data from the controllers.

In another aspect, the present disclosure provides a redundant control system applied to a BBW system in the event of malfunction of batteries for supplying power to the controllers for controlling each electronic brake.

In another aspect, the present disclosure provides a redundant control system applied to a BBW system for determining whether the controllers for respectively controlling electronic brakes malfunction and establishing logic for selecting a main controller among the controllers.

According to some embodiments of the present disclosure, a redundant control system applied to a brake-by-wire (BBW) system is provided. The redundant control system applied to a BBW system may include electromechanical brakes (EMBs) provided at wheels of a vehicle and configured to perform brake control of the vehicle, controllers connected to the EMBs, respectively, and a local gateway on a first communication line configured to receive information on the vehicle and a command of a driver and to transmit the information on the vehicle and the command of the driver to the controllers, wherein the controllers are configured to receive the information on the vehicle and the command of the driver through a second communication line.

For example, the controllers may determine whether the controllers malfunction based on data transmitted between the controllers, and the controllers except for a faulty controller may perform brake control of the vehicle based on the information on the vehicle and the command of the driver.

For example, any one of the controllers may be selected as a main controller, and when the faulty controller among the controllers is the main controller, any one of controllers that do not malfunction among the controllers may be selected as a new main controller.

For example, the controllers may include a first controller which is a main controller, a second controller, a third controller, and a fourth controller, and when the first controller malfunctions, the second controller may be selected as a new main controller, and the second controller, the third controller, and the fourth controller may control the vehicle in a safe mode.

For example, the first and second controllers may be connected, respectively, to two wheels diagonally opposite to each other, and the third and fourth controllers may be connected, respectively, to other two wheels diagonally opposite to each other.

For example, when the second controller also malfunctions, the third controller may be selected as a new main controller, and the third controller and the fourth controller may control the vehicle in an emergency driving mode to move the vehicle to a safe zone.

For example, each of the controllers may transmit a variable having a counter to remaining controllers and may primarily determine whether other controllers malfunction by comparing an increase in the respective counters of the received variables.

For example, each of the controllers may transmit information on erroneous variables, increased counters of which are not the same, to other controllers and, upon receiving two or more determination results of an error in a specific variable, each of the controllers may lastly determine that a controller matched with the specific variable malfunctions.

For example, two of the controllers may be connected to a first battery, two remaining controllers among the controllers may be connected to a second battery, and controllers respectively connected to the first battery and the second battery may be connected to diagonally oriented wheels of the vehicle.

For example, when any one of the first battery or the second battery malfunctions, the vehicle may be driven in a safe driving mode.

For example, the controllers may control the vehicle using 100% performance even if any one of the first communication line or the second communication line, to which signals are transmitted through the local gateway, malfunctions.

For example, the first communication line may be a communication network line used to control between the controllers and to share fault information, and the second communication line may be a communication network line to which information required to brake the vehicle is transmitted from other controllers for suspension, braking, and steering of the vehicle.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

DETAILED DESCRIPTION

Figure 1:
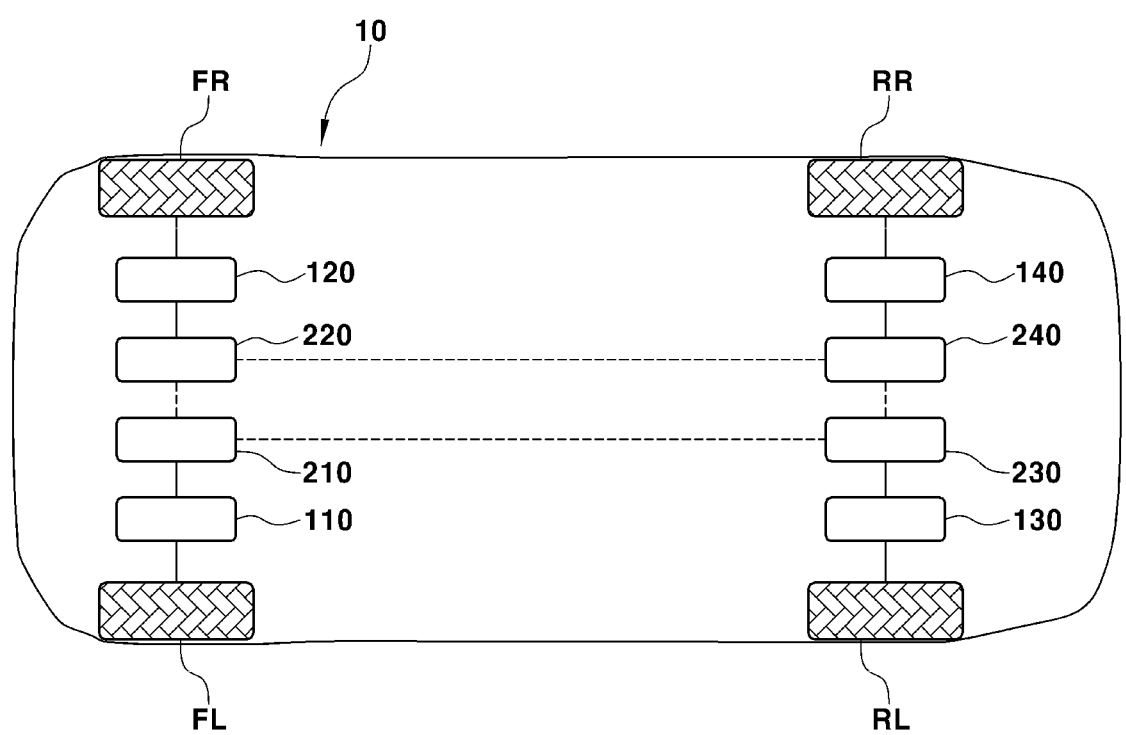
FIG. 1 is a diagram showing a brake-by-wire (BBW) system according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The attached drawings for illustrating exemplary embodiments of the present disclosure are to be referred to in order to gain a sufficient understanding of the present disclosure, the merits thereof, and the objectives accomplished by the implementation of the present disclosure. The present disclosure may, however, be embodied in many different forms, and should not be construed as being limited to the embodiments set forth herein; rather, these embodiments are provided so that this disclosure will be thorough and complete, and will fully convey the concept of the present disclosure to one of ordinary skill in the art. Meanwhile, the terminology used herein is for the purpose of describing particular embodiments and is not intended to limit the present disclosure. Like reference numerals in the drawings denote like elements.

Terms, such as "first", "second", and the like used in the specification may be used to distinguish the relevant elements using the reference relationship, and are not limited by the order.

The detailed description is used to exemplify the present disclosure. The description herein is given to show exemplary embodiments of the present disclosure, and the present disclosure may be used in various other combinations, changes, and environments. That is, the present disclosure may be changed or modified within the scope of the concept of the present disclosure disclosed in the specification, the equivalent scope of the given disclosure, and/or the scope of the technology or knowledge in the art. The described embodiment is the ideal embodiment for implementing the technological spirit of the present disclosure, but may be changed in various forms required in detailed applications and use of the present disclosure. Thus, the detailed description of the present disclosure herein is merely exemplary, and is not intended to limit the present disclosure. The following claims are to be interpreted as including other embodiments.

Figure 2:
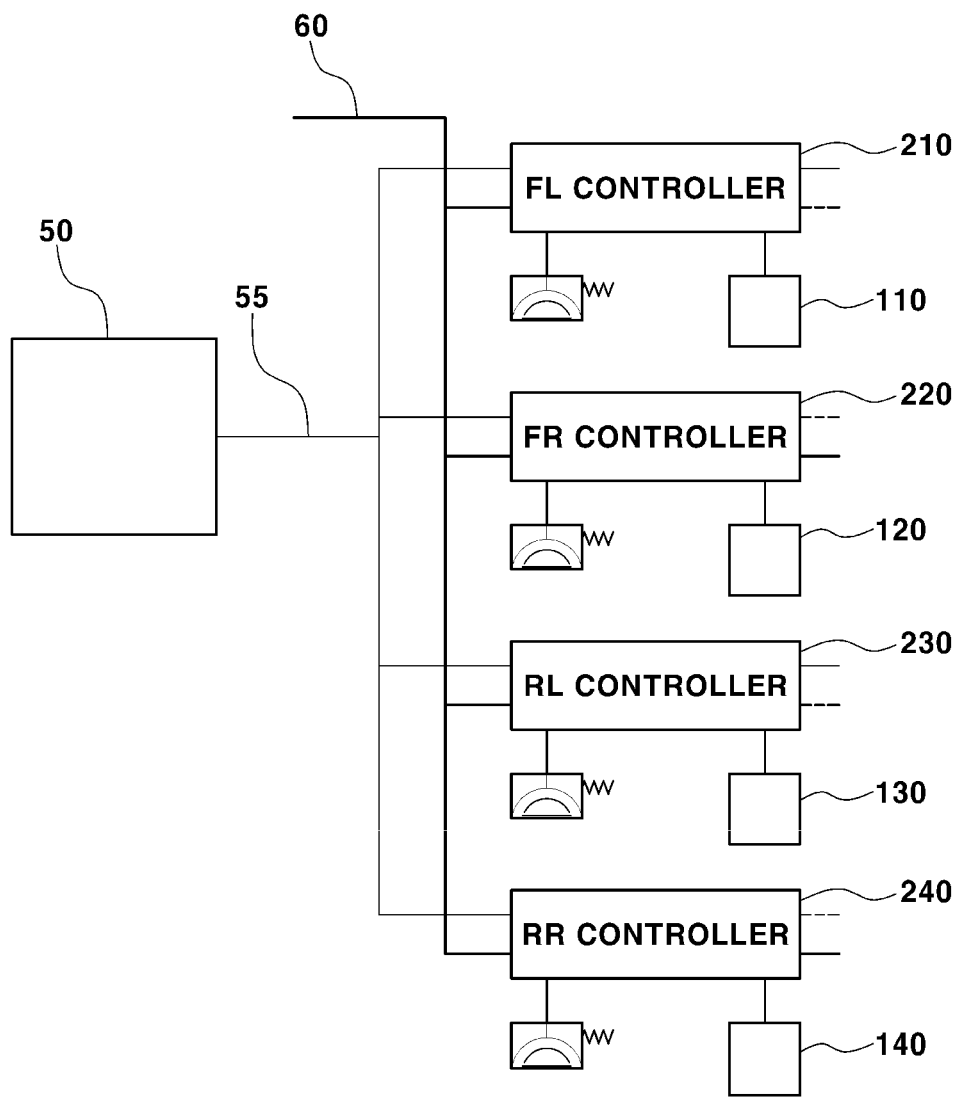
FIG. 2 is a diagram showing a redundant control system applied to a BBW system according to an embodiment of the present disclosure.

FIG. 1 is a diagram showing a brake-by-wire (BBW) system according to an embodiment of the present disclosure. FIG. 2 is a diagram showing a redundant control system applied to a BBW system according to an embodiment of the present disclosure.

Referring to FIGS. 1 and 2, the BBW system may be embodied using electromechanical brakes (EMBs) 110, 120, 130, and 140, and controllers 210, 220, 230, and 240 for controlling the EMBs 110, 120, 130, and 140. The EMBs 110, 120, 130, and 140 and the controllers 210, 220, 230, and 240 may be applied to wheels of a vehicle 10, respectively. The BBW system may independently control the wheels of the vehicle 10.

The EMBs 110, 120, 130, and 140 for brake control of the vehicle 10 may be respectively applied to front left and front right wheels FL and FR and rear left and rear right wheels RL and RR, which are installed in the vehicle 10. The EMBs 110, 120, 130, and 140 may each refer to a component including a brake for obtaining braking force by pressing a friction pad using a mechanical mechanism driven by an electric motor, differently from a general hydraulic pressure brake. The EMBs 110, 120, 130, and 140 may press disks, which are disposed on the front left and front right wheels FL and FR and the rear left and rear right wheels RL and RR, respectively, using driving force generated by a motor (not shown) and may brake the vehicle 10 by pressing the disk. The EMBs 110, 120, 130, and 140 may have a simple configuration and a high response speed compared with hydraulic pressure brake and may be more accurately controlled, thereby improving braking and safety performance.

The controllers 210, 220, 230, and 240 may be connected to the EMBs 110, 120, 130, and 140. The controllers 210, 220, 230, and 240 may include a first controller 210 connected to the front left wheel FL, a second controller 220 connected to the front right wheel FR, a third controller 230 connected to the rear left wheel RL, and a fourth controller 240 connected to the rear right wheel RR. The controllers 210, 220, 230, and 240 may receive information on a vehicle and a command of a driver and may control the EMBs 110, 120, 130, and 140, respectively, based on the analysis result of the information on the vehicle and the command of the driver. For example, the information on the vehicle may include a wheel speed, a steering angle, a yaw rate of the vehicle, an acceleration of the vehicle, and so on. For example, the command of the driver may include a manipulation amount of a brake pedal, a manipulation amount of an accelerator pedal, manipulation of an electronic parking brake (EPB), and so on. That is, the controllers 210, 220, 230, and 240 may receive various pieces of information for controlling the EMBs 110, 120, 130, and 140.

The information on the vehicle and the command of the driver may be transmitted to the controllers 210, 220, 230, and 240 through a dual communication line. The dual communication line may include a first communication line 55 and a second communication line 60. For example, the first communication line 55 may be a local communication line through a local gateway 50, and the second communication line 60 may be a chassis communication line. For example, the dual communication line may be embodied by CAN communication or CANFD communication. The first communication line 55 may refer to a communication network line used to control and share fault information between the controllers 210, 220, 230, and 240, and the second communication line 60 may refer to a communication network line for transmitting information required to brake a vehicle from other controllers for suspension, braking, and steering of the vehicle.

The local gateway 50 may receive the information on the vehicle and the command of the driver and may transmit the same to the controllers 210, 220, 230, and 240. The local gateway 50 may refer to a gateway applied to a communication network for data for controlling the EMBs 110, 120, 130, and 140. That is, data passing through the local gateway 50 may be transmitted only through the controllers 210, 220, 230, and 240.

The controllers 210, 220, 230, and 240 may receive the information on the vehicle 10 and the command of the driver through the second communication line 60. A body CAN communication line for transmitting a signal for controlling each body (an electric side mirror, a power window, etc.) of the vehicle 10, a chassis communication line for transmitting a signal for controlling each chassis (suspension, steering, and brake devices, etc.), and a multimedia communication line for transmitting a signal for controlling multimedia (an AVN system including a navigation device, an audio device, etc.) may be applied to the vehicle 10. The controllers 210, 220, 230, and 240 are configured to receive the information on the vehicle 10 and the command of the driver from the second communication line 60 that is a chassis communication line for transmitting a signal for controlling suspension, steering, and brake devices, etc. In other words, the chassis communication line may transfer a signal output from other controllers for controlling a chassis of a vehicle including suspension, steering, and brake devices, etc. to the controllers 210, 220, 230, and 240 according to the present disclosure. That is, the controllers 210, 220, 230, and 240 are configured to receive the information on the vehicle 10 and the command of the driver through the second communication line 60, and thus a redundancy system of the BBW system may be established.

The four controllers 210, 220, 230, and 240 may be electrically connected to each other. When any one of the four controllers 210, 220, 230, and 240 malfunctions, the controllers 210, 220, 230, or 240 that normally function may replace a function of the faulty controller (any one of the controllers 210, 220, 230, and 240). The controllers 210, 220, 230, and 240 may determine whether the controllers 210, 220, 230, and 240 malfunction based on data transmitted between the controllers 210, 220, 230, and 240. The controllers 210, 220, 230 or 240 except for the faulty controller (any one of the controllers 210, 220, 230, and 240) may perform motion control and brake control of the vehicle 10 based on the information on the vehicle 10 and the command of the driver.

For example, assuming that the sum of the maximum braking force to be generated by a motor (not shown) of each of the wheels FL, FR, RL, and RR and the maximum braking force is equally distributed to the wheels FL, FR, RL, and RR, the maximum braking force to be generated by the EMBs 110, 120, 130, and 140 may be lowered to a level of about 75% due to malfunction of one controller (any one of the controllers 210, 220, 230, and 240). For example, the faulty controller may be the first controller 210. In this case, the three normal controllers 220, 230, and 240 may distribute braking force required by the vehicle 10 to the EMBs 120, 130, and 140 except for the EMB 110 connected to the first controller 210.

For example, when a problem arise in terms of connection between the first communication line 55 and the controllers 210, 220, 230, and 240, the controllers 210, 220, 230, and 240 may receive data required to drive the vehicle 10 through the second communication line 60. In contrast, when a problem arise in terms of connection between the second communication line 60 and the controllers 210, 220, 230, and 240, the controllers 210, 220, 230, and 240 may receive data required to drive the vehicle 10 through the first communication line 55. By establishing the dual communication line through the first communication line 55 and the second communication line 60, a redundancy system for controlling the EMBs 110, 120, 130, and 140 may be established. That is, the controllers 210, 220, 230, and 240 may also control the vehicle 10 using 100% performance when any one of the first communication line 55 or the second communication line 60, to which signals are transmitted through the local gateway 50, malfunctions.

For example, any one (any one of the controllers 210, 220, 230, and 240) of the controllers 210, 220, 230, and 240 may be selected as a main controller. The main controller may be a controller that is pre-selected before the vehicle 10 is turned on. When the main controller malfunctions, any one of the controllers that do not malfunction among the controllers 210, 220, 230, and 240 may be selected as a new main controller.

According to an embodiment of the present disclosure, the redundant control system of the EMBs 110, 120, 130, and 140 may transmit information required to drive the vehicle 10 through the dual communication line, and thus even if any one communication line malfunctions, driving and braking performance of the vehicle 10 may not be affected. Accordingly, the stability of driving and braking of the vehicle 10 may be ensured.

According to an embodiment of the present disclosure, the controllers 210, 220, 230, and 240 are connected to the EMBs 110, 120, 130, and 140, respectively, and thus even if any one of the controllers 210, 220, 230, and 240 malfunctions, there may be no situation in which the vehicle 10 becomes impossible to drive. When any one of the controllers 210, 220, 230, and 240 malfunctions, driving or braking of the EMBs 110, 120, 130, and 140 may be controlled in order to safely drive the vehicle 10 or to move the vehicle 10 to a safe zone.

Figure 3:
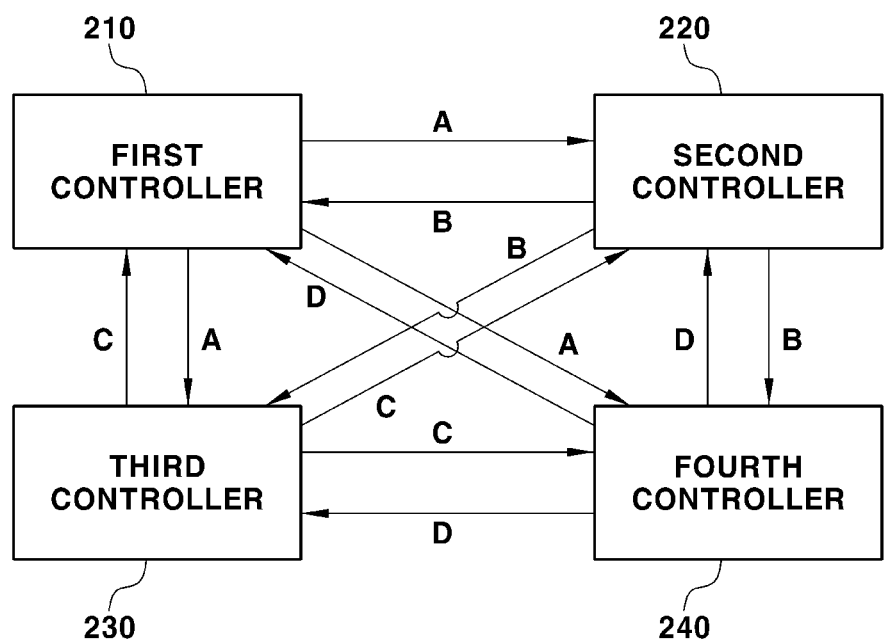
FIG. 3 is a diagram for explaining a method of determining whether controllers malfunction by transmitting data between the controllers according to an embodiment of the present disclosure.

FIG. 3 is a diagram for explaining a method of determining whether controllers malfunction by transmitting data between the controllers according to an embodiment of the present disclosure.

Referring to FIGS. 2 and 3, the controllers 210, 220, 230, and 240 may include the first controller 210, the second controller 220, the third controller 230, and the fourth controller 240. According to an embodiment of the present disclosure, the first controller 210 may be a main controller.

For example, the controllers 210, 220, 230, and 240 may determine that a fault occurs in a controller, which does not transmit or receive data within a predetermined time. Each of the controllers 210, 220, 230, and 240 may transmit a variable having a counter (of which increases at a frequency) to remaining ones of the controllers 210, 220, 230, and 240. However, a variable may not be transmitted to the controllers 210, 220, 230, and 240 that malfunction.

For example, each of the controllers 210, 220, 230, and 240 may transmit a variable having a counter (of which increases at a frequency) to remaining ones of the controllers 210, 220, 230, and 240. The first controller 210 may transmit a variable A that defines a unique ID to the second controller 220, the third controller 230, and the fourth controller 240. The second controller 220 may transmit a variable A that defines a unique ID to the first controller 210, the third controller 230, and the fourth controller 240. The third controller 230 may transmit a variable C that defines a unique ID to the first controller 210, the second controller 220, and the fourth controller 240. The fourth controller 240 may transmit a variable D that defines a unique ID to the first controller 210, the second controller 220, and the third controller 230. The variables A, B, C, and D may each be a value having a counter that increases at a predetermined frequency. The controllers 210, 220, 230, and 240 may simultaneously transmit the respective variables. The controllers 210, 220, 230, and 240 may compare an increase in the respective counters of the received variables to primarily determine whether the controllers 210, 220, 230, and 240 malfunction. In particular, the first controller 210 may receive the variables B, C, and D and may compare the increased counters of the variables B, C, and D. The second controller 220 may receive the variables A, C, and D and may compare the increased counters of the variables A, C, and D. The third controller 230 may receive the variables A, B, and D and may compare the increased counters of the variables A, B, and D. The fourth controller 240 may receive the variables A, B, and C and may compare the increased counters of the variables A, B, and C. With regard to determination logic of the first controller 210, when the counters of the variables B, C, and D do not correspond to each other, the first controller 210 may determine that there is an error in at least one of the variables B, C, and D. When the counters of the variables B and C are the same but the counters of the variables C and D and the counters of the variables B and D are not the same, the first controller 210 may determine that there is an error in the variable D and a fault occurs in the fourth controller 240 to which the variable D is transmitted.

Unlike in the aforementioned example, the controllers 210, 220, 230, and 240 may not simultaneously transmit a variable. However, the controllers 210, 220, 230, and 240 may compare values obtained by averaging the increased counters of the variables and may determine a variable in which an error occurs.

Each of the controllers 210, 220, 230, and 240 may transmit information on erroneous variables, increased counters of which are not the same, to other controllers. For example, the first controller 210 may transmit the result indicating that an error occurs in the variable D to the second controller 220, the third controller 230, and the fourth controller 240. Upon receiving two or more determination results of an error in a specific variable, each of the controllers 210, 220, 230, and 240 may lastly determine that a controller matched with the specific variable malfunctions. For example, upon receiving a result indicating that an error occurs in the variable D from two or more of the first controller 210, the third controller 230, and the fourth controller 240, the second controller 220 may determine that a fault occurs in the fourth controller 240 that is a controller matched with the variable D. In this case, when the fourth controller 240 is a maintain controller, any one of the controllers 210, 220, and 230 may be selected as a new main controller.

According to an embodiment of the present disclosure, a controller in which a fault occurs among the controllers 210, 220, 230, and 240 may be recognized in real time by transmitting and receiving data between the controllers 210, 220, 230, and 240. As such, a control strategy for ensuring the stability of a vehicle may be established.

Figure 4:
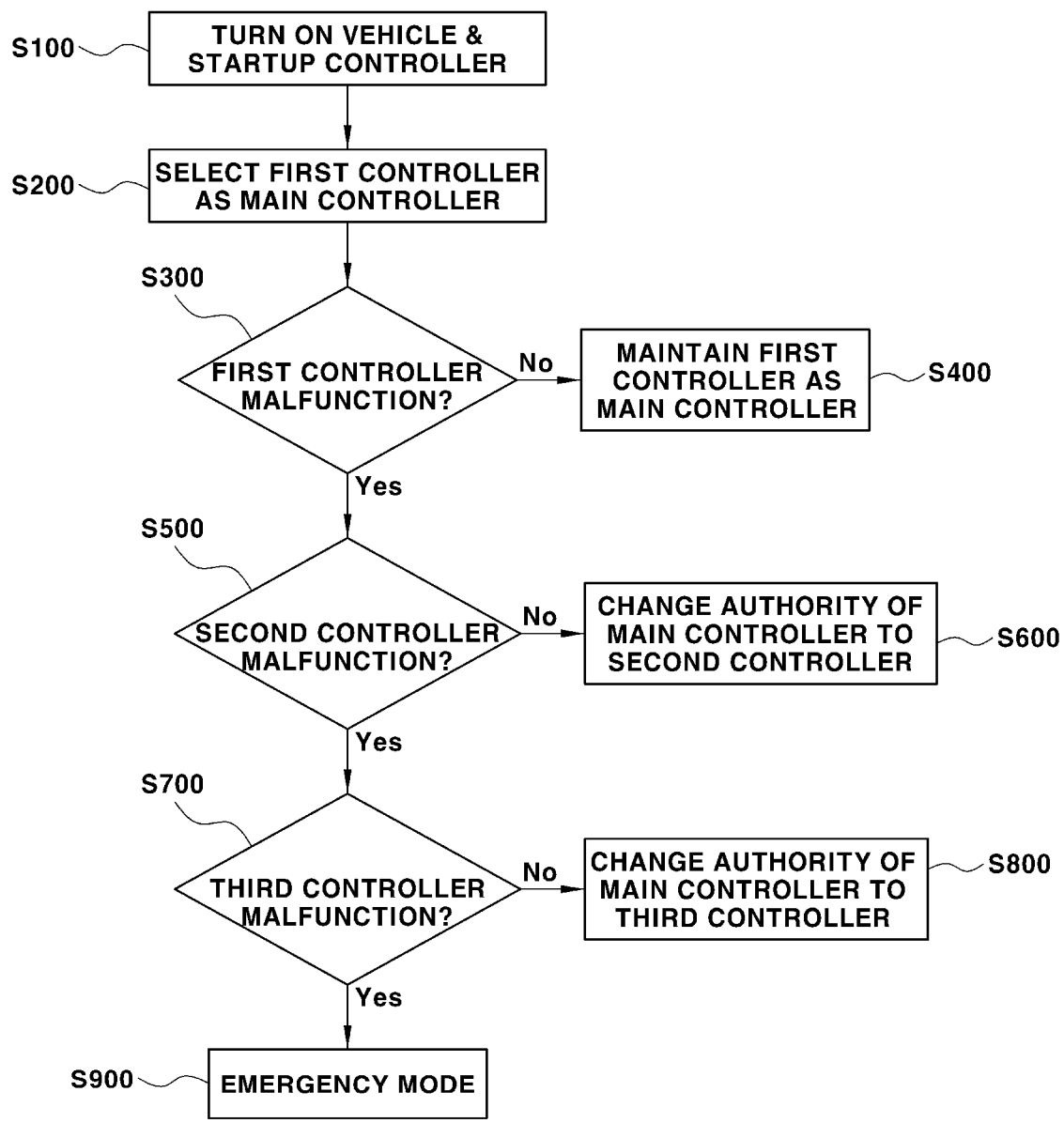
FIG. 4 is a diagram for explaining logic for changing authority of a main controller according to an embodiment of the present disclosure.

FIG. 4 is a diagram for explaining logic for changing authority of a main controller according to an embodiment of the present disclosure. For simplicity, repeated explanation will not be given.

Referring to FIG. 4, after a vehicle is turned on and controllers are started up, whether controllers malfunction may be determined (S100).

The controllers may include a first controller, a second controller, a third controller, and a fourth controller. In this case, the current state may be the state in which first controller is selected as a main controller or the first controller may be arbitrarily selected as the main controller (S200).

The controllers may determine whether the controllers malfunction by exchanging data therebetween. In particular, the controllers may transmit a unique variable having a counter that increases every predetermined time to other controllers, and may compare an increase in the respective counters of the received variables to determine whether the controllers malfunction. The controllers may preferentially recognize whether the main controller malfunctions (S300).

When the first controller does not malfunction, the first controller may be maintained as a main controller. In this case, 100% of the driving or braking performance of the vehicle may be achieved (S400).

When a fault occurs in the first controller, each controller may determine whether the second controller malfunctions (S500).

When the second controller does not malfunction, authority of the main controller may be changed to the second controller from the first controller. When one of the four controllers malfunctions, the second controller, the third controller, and the fourth controller may control the vehicle in a safe mode. In this case, the safe mode may refer to control of the vehicle to a destination in a limp home mode in the state in which driving performance and braking performance are limited. For example, the first and second controllers are connected, respectively, to two wheels diagonally opposite to each other. When all controllers connected to a front wheel malfunction, it may be impossible to stably drive the vehicle using only controllers connected to a rear wheel. Accordingly, after whether the first controller malfunctions is determined, whether the second controller that is diagonally positioned to the first controller malfunctions may be determined (S600).

When a fault occurs in the second controller, each of the controllers may determine whether the third controller malfunctions (S700).

When the third controller does not malfunction, authority of the main controller may be changed to the third controller from the second controller. When two of the four controllers malfunction, the third controller and the fourth controller may control the vehicle in an emergency driving mode. In this case, the emergency driving mode may refer to control for moving the vehicle to a safe zone in a limp aside mode. For example, the third and fourth controllers are connected, respectively to other two wheels diagonally opposite to each other (S800).

Upon determining that a fault occurs in the third controller, the vehicle may be controlled in an emergency mode irrespective of whether the fourth controller malfunctions. It may be impossible to stably control the vehicle or to move the vehicle to a safe zone using only the fourth controller and the electromechanical brake (EMB) connected thereto. Accordingly, the vehicle may be stopped in the emergency mode of the vehicle (S900).

Separate controllers of the BBW system may simultaneously perform vehicle movement control and braking force control, but when braking force reference values calculated for respective controllers are used, malfunction such as excessive braking or insufficient braking of the vehicle may occur due to a difference in the reference values. Accordingly, a procedure for processing braking force calculated by each controller through a main controller among controllers may be required. According to an embodiment of the present disclosure, logic for selecting a main controller may be provided in order to prevent malfunction of the vehicle when the main controller among the controllers is not selected.

Figure 5:
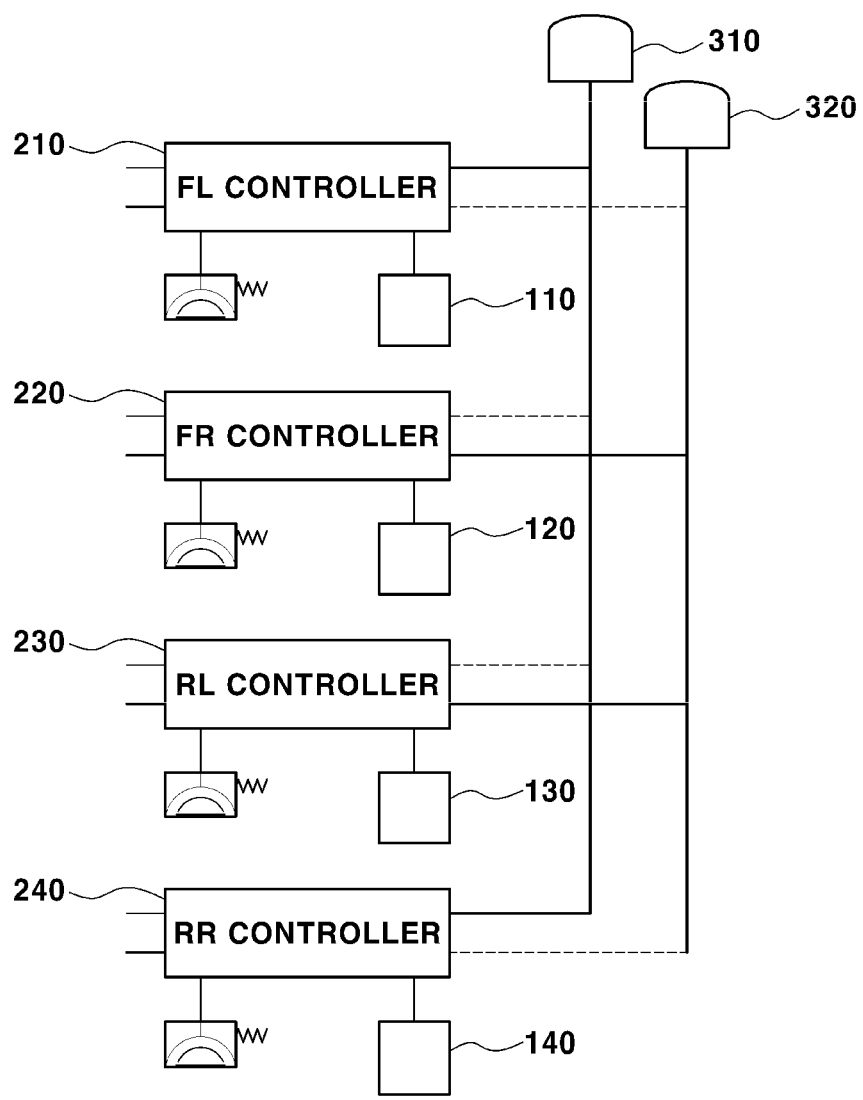
FIG. 5 is a diagram for explaining connection between controllers and batteries according to an embodiment of the present disclosure.

FIG. 5 is a diagram for explaining connection between controllers and batteries according to an embodiment of the present disclosure.

Referring to FIG. 5, a first battery 310 and a second battery 320 may be applied to a vehicle. The first battery 310 may supply power to the first controller 210 and the third controller 230, and the second battery 320 may supply power to the second controller 220 and the fourth controller 240. The controllers 210, 220, 230, and 240 connected to each of the first battery 310 and the second battery 320 may be the controllers 210, 220, 230, and 240 connected to diagonally oriented wheels of the vehicle. In detail, the first controller 210 and the fourth controller 240 may be connected to diagonally oriented wheels of the vehicle, and the second controller 220 and the third controller 230 may be connected to diagonally oriented wheels of the vehicle. When any one of the first battery 310 or the second battery 320 malfunctions, the vehicle may be driven in a safe driving mode.

For example, when a fault occurs in the first battery 310, the front right wheel FR of the vehicle and the rear left wheel RL of the vehicle may be controlled by the second controller 220 and the third controller 230 that receive power from the second battery 320. It may be possible to drive the vehicle only when diagonally oriented wheels based on the vehicle are controlled. When the vehicle is braked using the front left and front right wheels FL and FR or the rear left and rear right wheels RL and RR of the vehicle, the vehicle may be sharply pulled to one side by braking one side of the vehicle. When the vehicle is braked using only the left wheels FL and RL or the right wheels FR and RR, the vehicle may be sharply pulled to one side by braking one side of the vehicle. Accordingly, the stability of braking of the vehicle may be ensured by connecting the different batteries 310 and 320 to diagonally oriented wheels of the vehicle even if any one of the batteries 310 and 320 malfunctions.

According to an embodiment of the present disclosure, the redundant control system applied to the BBW system may be capable of transmitting information required to drive the vehicle through a dual communication line, and accordingly, even if a fault occurs in any one communication line, the performance of braking of the vehicle may not be affected. Accordingly, the stability of braking of the vehicle may be ensured.

According to an embodiment of the present disclosure, controllers may be connected to the electromechanical brakes (EMBs), respectively, and accordingly, even if a fault occurs in any one of the controllers, there may be no situation in which the vehicle becomes impossible to drive. When any one of the controllers malfunctions, braking of the EMBs may be controlled in order to safely drive the vehicle or to move the vehicle to a safe zone.

According to an embodiment of the present disclosure, logic for selecting a main controller may be provided in order to prevent malfunction of the vehicle when the main controller among the controllers is not selected.

According to an embodiment of the present disclosure, the stability of braking of the vehicle may be ensured by connecting different batteries to diagonally oriented wheels of the vehicle even if any one of the batteries malfunctions.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A redundant control system applied to a brake-by-wire (BBW) system, the redundant control system comprising:
   electromechanical brakes (EMBs) provided, respectively, at wheels of a vehicle and configured to perform brake control of the vehicle;
   respective controllers connected to each of the EMBs; and
   a local gateway on a first communication line configured to receive information on the vehicle and a command of a driver and to transmit the information on the vehicle and the command of the driver to the controllers;
   wherein the first communication line is a communication network line used to control and to share fault information between the controllers;

wherein the controllers are configured to receive the information on the vehicle and the command of the driver through a second communication line; and wherein the second communication line is a chassis communication network line to which information required to brake the vehicle is transmitted from other controllers for suspension, braking, and steering of the vehicle.

2. The redundant control system of claim 1, wherein the controllers determine whether the controllers malfunction based on data transmitted between the controllers, and the controllers except for a faulty controller perform brake control of the vehicle based on the information on the vehicle and the command of the driver.

3. The redundant control system of claim 2, wherein any one of the controllers is selected as a main controller, and when the faulty controller among the controllers is the main controller, any one of the controllers that do not malfunction among the controllers is selected as a new main controller.

4. The redundant control system of claim 2, wherein:
the controllers comprise a first controller which is a main controller, a second controller, a third controller, and a fourth controller; and
when the first controller malfunctions, the second controller is selected as a new main controller, and the second controller, the third controller, and the fourth controller control the vehicle in a safe mode.

5. The redundant control system of claim 4, wherein:
the first and second controllers are connected, respectively, to two wheels diagonally opposite to each other; and
the third and fourth controllers are connected, respectively to other two wheels diagonally opposite to each other.

6. The redundant control system of claim 4, wherein when the second controller also malfunctions, the third controller is selected as a new main controller; and
the third controller and the fourth controller control the vehicle in an emergency driving mode to move the vehicle to a safe zone.

7. The redundant control system of claim 1, wherein each of the controllers transmits a variable having a counter to remaining controllers and primarily determines whether other controllers malfunction by comparing an increase in the respective counters of the received variables.

8. The redundant control system of claim 7, wherein each of the controllers transmit information on erroneous variables having the counters that are not the same to other controllers, and upon receiving two or more determination results of an error in a specific variable, each of the controllers lastly determines that a controller matched with the specific variable malfunctions.

9. The redundant control system of claim 1, wherein two of the controllers are connected to a first battery;
two remaining controllers among the controllers are connected to a second battery; and
controllers respectively connected to the first battery and the second battery are connected to diagonally oriented wheels of the vehicle.

10. The redundant control system of claim 9, wherein when any one of the first battery or the second battery malfunctions, the vehicle is driven in a safe driving mode.

11. The redundant control system of claim 1, wherein the controllers control the vehicle even if any one of the first communication line or the second communication line, to which signals are transmitted through the local gateway, malfunctions.

* * * * *